United States Patent
Obasih et al.

(10) Patent No.: US 9,825,343 B2
(45) Date of Patent: Nov. 21, 2017

(54) BATTERY MODULE PASSIVE THERMAL MANAGEMENT FEATURES AND POSITIONING

(71) Applicant: Johnson Controls Technology Company, Holland, MA (US)

(72) Inventors: Kem M. Obasih, Brookfield, WI (US); Richard M. DeKeuster, Racine, WI (US)

(73) Assignee: Johnson Controls Technology Company, Holland, MI (US)

( * ) Notice: Subject to any disclaimer, the term of this patent is extended or adjusted under 35 U.S.C. 154(b) by 228 days.

(21) Appl. No.: 14/502,803

(22) Filed: Sep. 30, 2014

(65) Prior Publication Data

US 2016/0093932 A1    Mar. 31, 2016

(51) Int. Cl.
| | |
|---|---|
| *H01M 10/613* | (2014.01) |
| *H01M 10/625* | (2014.01) |
| *H01M 10/647* | (2014.01) |
| *H01M 10/6551* | (2014.01) |
| *H01M 2/02* | (2006.01) |

(Continued)

(52) U.S. Cl.
CPC ......... *H01M 10/625* (2015.04); *H01M 2/024* (2013.01); *H01M 2/1077* (2013.01); *H01M 10/0525* (2013.01); *H01M 10/613* (2015.04); *H01M 10/647* (2015.04);

(Continued)

(58) Field of Classification Search
CPC ............. H01M 10/625; H01M 10/613; H01M 10/647; H01M 10/6551; H01M 10/6562; H01M 2/024; H01M 2/1077
See application file for complete search history.

(56) References Cited

U.S. PATENT DOCUMENTS 4,994,940 A * 2/1991 Thouvenin ............... H05K 7/18
  361/692
5,215,834 A  6/1993 Reher et al.
(Continued)

FOREIGN PATENT DOCUMENTS

| AU | 2010273997 A1 | 2/2012 |
|---|---|---|
| EP | 2325920 A2 | 5/2011 |

(Continued)

OTHER PUBLICATIONS

PCT/US2015/035802 International Search Report and Written Opinion dated Sep. 30, 2015.

(Continued)

*Primary Examiner* — Jonathan Jelsma
(74) *Attorney, Agent, or Firm* — Fletcher Yoder, PC

(57) ABSTRACT

The present disclosure includes a battery system with a battery module having electrochemical cells inside of a housing. The housing includes a first side and a second side opposite to the first side. The battery module includes a heat sink coupled with the second side of the housing and a thermal interface disposed between, and in contact with, the heat sink and the electrochemical cells. The thermal interface contacts base ends of the electrochemical cells. The system includes a cage disposed about the battery module. The cage includes a cage side positioned next to the second side of the housing and having openings disposed in the cage side. The openings enable air to be drawn into the cage. The air passes over the heat sink of the battery module.

23 Claims, 6 Drawing Sheets

(51) Int. Cl.
*H01M 2/10* (2006.01)
*H01M 10/0525* (2010.01)
*H01M 10/6562* (2014.01)
*H01M 10/6554* (2014.01)

(52) U.S. Cl.
CPC ... *H01M 10/6551* (2015.04); *H01M 10/6562* (2015.04); *H01M 10/6554* (2015.04); *H01M 2220/20* (2013.01)

(56) References Cited

U.S. PATENT DOCUMENTS

| | | | |
|---|---|---|---|
| 5,385,793 A | 1/1995 | Tiedemann et al. | |
| 5,449,571 A | 9/1995 | Longardner et al. | |
| 5,585,204 A | 12/1996 | Oshida et al. | |
| 5,681,668 A | 10/1997 | Reed et al. | |
| 5,721,064 A | 2/1998 | Pedicini et al. | |
| 6,459,580 B1 | 10/2002 | Della Fiora et al. | |
| 6,468,150 B1 | 10/2002 | Langdon et al. | |
| 6,566,005 B1 | 5/2003 | Shimma et al. | |
| 6,628,521 B2 | 9/2003 | Gustine et al. | |
| 6,781,830 B2 | 8/2004 | Barth et al. | |
| 6,798,663 B1 | 9/2004 | Rubenstein | |
| 6,808,834 B2 | 10/2004 | Koschany | |
| 6,866,544 B1 | 3/2005 | Casey et al. | |
| 6,949,309 B2 | 9/2005 | Moores, Jr. et al. | |
| 7,112,387 B2 | 9/2006 | Kimoto et al. | |
| 7,172,831 B2 | 2/2007 | Jaura et al. | |
| 7,189,473 B2 | 3/2007 | Smith et al. | |
| 7,304,844 B2 | 12/2007 | Jan et al. | |
| 7,326,490 B2 | 2/2008 | Moores, Jr. et al. | |
| 7,357,135 B2 | 4/2008 | Cunningham | |
| 7,371,965 B2 | 5/2008 | Ice | |
| 7,388,745 B2 | 6/2008 | Deluga et al. | |
| 7,405,932 B2 | 7/2008 | Vinson et al. | |
| 7,414,841 B2 | 8/2008 | Chen et al. | |
| 7,447,028 B2 | 11/2008 | Lai et al. | |
| 7,558,061 B2 | 7/2009 | Franz et al. | |
| 7,560,190 B2 | 7/2009 | Ahn et al. | |
| 7,572,549 B2 | 8/2009 | Wegner | |
| 7,618,740 B2 | 11/2009 | Hamada et al. | |
| 7,642,003 B2 | 1/2010 | Ahn et al. | |
| 7,654,351 B2 | 2/2010 | Koike et al. | |
| 7,736,792 B2 | 6/2010 | Moores, Jr. et al. | |
| 7,746,033 B2* | 6/2010 | Lee | H01M 2/1077 320/150 |
| 7,746,034 B2 | 6/2010 | Lee et al. | |
| 7,867,663 B2 | 1/2011 | Park et al. | |
| 7,947,387 B2 | 5/2011 | Saito et al. | |
| 7,968,223 B2 | 6/2011 | Lee et al. | |
| 7,974,098 B2 | 7/2011 | Oki et al. | |
| 7,984,943 B2 | 7/2011 | Iwano et al. | |
| 7,987,939 B2 | 8/2011 | Kisiler et al. | |
| 8,003,245 B2 | 8/2011 | Lee et al. | |
| 8,035,973 B2 | 10/2011 | McColloch | |
| 8,042,637 B2 | 10/2011 | Nagata et al. | |
| 8,080,972 B2 | 12/2011 | Smith | |
| 8,081,470 B2 | 12/2011 | Oki et al. | |
| 8,084,156 B2 | 12/2011 | Okuda et al. | |
| 8,085,538 B2 | 12/2011 | Noshadi et al. | |
| 8,096,136 B2 | 1/2012 | Zheng | |
| 8,197,958 B2 | 6/2012 | Gaben et al. | |
| 8,394,521 B2 | 3/2013 | Umemoto et al. | |
| 8,399,118 B2 | 3/2013 | Gadawski et al. | |
| 8,440,339 B2 | 5/2013 | Harada et al. | |
| 8,459,343 B2 | 6/2013 | Hung et al. | |
| 8,475,953 B2 | 7/2013 | Chew et al. | |
| 8,492,019 B2 | 7/2013 | Klaus et al. | |
| 8,507,122 B2 | 8/2013 | Saito et al. | |
| 8,518,568 B2 | 8/2013 | Dougherty et al. | |
| 8,530,069 B2 | 9/2013 | Wood et al. | |
| 8,609,268 B2 | 12/2013 | Fuhr et al. | |
| 8,617,735 B2 | 12/2013 | Lee et al. | |
| 8,642,204 B2 | 2/2014 | Higashino et al. | |
| 8,647,762 B2 | 2/2014 | Schwab et al. | |
| 8,652,678 B2 | 2/2014 | Musetti | |
| 8,663,829 B2 | 3/2014 | Koetting et al. | |
| 8,685,556 B2 | 4/2014 | Minokawa | |
| 8,685,558 B2 | 4/2014 | Fuhrmann et al. | |
| 8,722,229 B2 | 5/2014 | Haussmann | |
| 8,734,975 B2 | 5/2014 | Burrows et al. | |
| 8,739,856 B2 | 6/2014 | Fedorov | |
| 8,758,924 B2 | 6/2014 | Tennessen et al. | |
| 8,785,024 B2 | 7/2014 | Han et al. | |
| 8,785,025 B2 | 7/2014 | Sohn | |
| 8,785,026 B2 | 7/2014 | Hu et al. | |
| 8,785,027 B2 | 7/2014 | Soong et al. | |
| 2005/0008912 A1 | 1/2005 | Yang et al. | |
| 2005/0269995 A1 | 12/2005 | Donnelly et al. | |
| 2006/0093901 A1 | 5/2006 | Lee et al. | |
| 2006/0216579 A1 | 9/2006 | Cho | |
| 2007/0144804 A1* | 6/2007 | Pike | B60L 11/1874 180/170 |
| 2007/0248876 A1 | 10/2007 | Ahn et al. | |
| 2008/0280192 A1 | 11/2008 | Drozdz et al. | |
| 2008/0299448 A1 | 12/2008 | Buck et al. | |
| 2009/0135558 A1 | 5/2009 | Hughes | |
| 2009/0155675 A1 | 6/2009 | Houchin-Miller | |
| 2009/0155680 A1 | 6/2009 | Maguire et al. | |
| 2009/0197166 A1* | 8/2009 | Horii | B60K 1/04 429/176 |
| 2009/0253029 A1 | 10/2009 | Inoue | |
| 2010/0104927 A1 | 4/2010 | Albright | |
| 2011/0039142 A1 | 2/2011 | Kwag et al. | |
| 2011/0091759 A1 | 4/2011 | Song | |
| 2011/0104543 A1 | 5/2011 | Kim et al. | |
| 2011/0111273 A1 | 5/2011 | Okada et al. | |
| 2011/0135993 A1 | 6/2011 | An et al. | |
| 2011/0189522 A1 | 8/2011 | Kim | |
| 2011/0189525 A1 | 8/2011 | Palanchon et al. | |
| 2011/0229749 A1 | 9/2011 | Kim et al. | |
| 2011/0244291 A1 | 10/2011 | Sun | |
| 2011/0256431 A1 | 10/2011 | TenHouten et al. | |
| 2011/0287285 A1* | 11/2011 | Yoon | H01M 10/5016 429/9 |
| 2011/0311848 A1 | 12/2011 | Garascia et al. | |
| 2011/0318618 A1* | 12/2011 | Yajima | H01M 2/1077 429/72 |
| 2012/0148881 A1 | 6/2012 | Quisenberry | |
| 2012/0148889 A1* | 6/2012 | Fuhr | H01M 2/1077 429/87 |
| 2012/0237805 A1 | 9/2012 | Abels et al. | |
| 2012/0247107 A1 | 10/2012 | Balk et al. | |
| 2012/0263988 A1 | 10/2012 | Obasih et al. | |
| 2013/0071706 A1 | 3/2013 | Lee | |
| 2013/0136955 A1 | 5/2013 | Chuang et al. | |
| 2013/0183571 A1 | 7/2013 | Miyazaki et al. | |
| 2013/0216872 A1 | 8/2013 | Fuhr et al. | |
| 2013/0260194 A1 | 10/2013 | Meyer et al. | |
| 2014/0038010 A1 | 2/2014 | Ronning et al. | |
| 2014/0079974 A1 | 3/2014 | Schmidt et al. | |
| 2014/0093765 A1 | 4/2014 | Kusunoki | |
| 2014/0113167 A1 | 4/2014 | Itoi et al. | |
| 2014/0154541 A1 | 6/2014 | Asakura et al. | |
| 2014/0186661 A1 | 7/2014 | Payne | |
| 2014/0186693 A1* | 7/2014 | Tyler | H01M 2/0262 429/186 |
| 2015/0249238 A1 | 9/2015 | Andre et al. | |

FOREIGN PATENT DOCUMENTS

| | | |
|---|---|---|
| EP | 2372760 A2 | 10/2011 |
| WO | 2010099355 A2 | 9/2010 |
| WO | 2011060074 A2 | 5/2011 |
| WO | 2011077109 A1 | 6/2011 |
| WO | 2013186020 A1 | 12/2013 |

OTHER PUBLICATIONS

Pesaran, Ahmad A., Battery Thermal Management in EVs and HEVs: Issues and Solutions, Advanced Automotive Battery Conference, Las Vegas, Nevada, Feb. 6-8, 2001, pp. 1-10.

(56) References Cited

OTHER PUBLICATIONS

Albright, Greg et al., A Comparison of Lead Acid to Lithium-ion in Stationary Storage Applications, AllCell Technologies LLC, Mar. 2012, pp. 1-14.

* cited by examiner

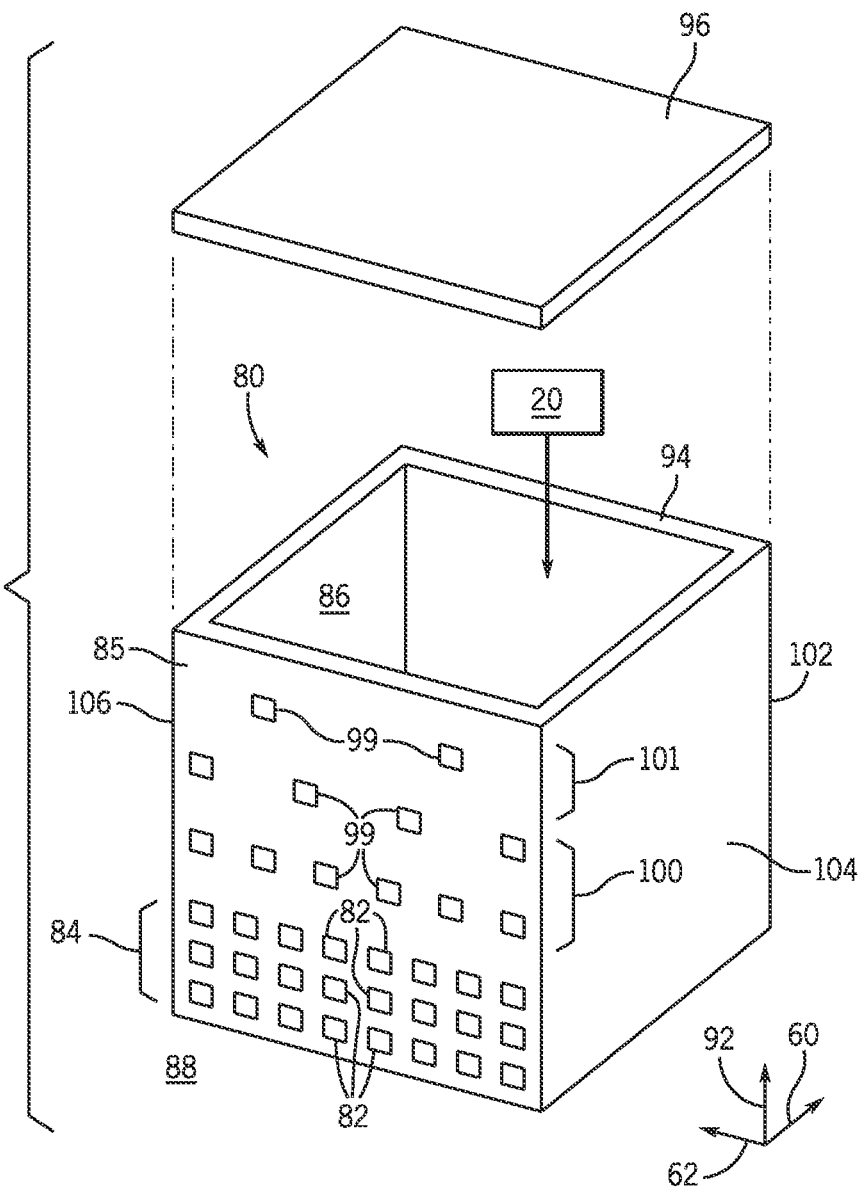

BATTERY MODULE PASSIVE THERMAL MANAGEMENT FEATURES AND POSITIONING

BACKGROUND

The present disclosure relates generally to the field of batteries and battery modules. More specifically, the present disclosure relates to passive thermal management features for Lithium-ion (Li-ion) battery modules.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, traditional battery modules are susceptible to heating or overheating, which may negatively affect components of the battery module and electrochemical cells thereof.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure includes a battery system having a battery module. The battery module includes electrochemical cells and a housing that houses the electrochemical cells, where the housing includes a first side and a second side opposite to the first side. The battery module also includes a heat sink coupled with the second side of the housing and a thermal interface disposed between, and in contact with, the heat sink and the electrochemical cells. The thermal interface physically contacts base ends of the electrochemical cells opposite to terminal ends of the electrochemical cells, where the terminal ends include terminals. The system further includes a cage disposed around the battery module, where the cage includes a cage side positioned next to the second side of the housing of the battery module and having openings disposed in a portion of the cage side. The openings enable air to be drawn through the openings from an area external to the cage, such that the air enters into the cage and passes over the heat sink of the battery module along a path extending from a first end of the heat sink to a second end of the heat sink.

The present disclosure also relates to a battery system having a battery module that includes a housing configured to house electrochemical cells therein, where the battery module includes a heat sink coupled to a first side of the housing. The system also includes a cage configured to receive the battery module, where the cage includes a cage side configured to be aligned with the first side of the housing of the battery module and having openings disposed in a portion of the cage side, where the openings enable air to be drawn through the openings from an area external to the cage such that the air enters into the cage and passes over the heat sink of the battery module along a path extending from a first end of the heat sink to a second end of the heat sink.

The present disclosure further relates to a battery system having a battery module. The battery module includes a housing that houses electrochemical cells in two stacks of electrochemical cells. The housing includes a first side and a second side opposite to the first side, where the second side includes two cutouts, each cutout being aligned with a respective one of the two stacks of electrochemical cells. The battery module further includes two heat sinks disposed in the two cutouts and aligned with the two stacks of electrochemical cells, and two thermal interfaces, each thermal interface being disposed between, and in contact with, a respective one of the two heat sinks and a respective one of the two stacks of electrochemical cells. The two thermal interfaces physically contact base ends of the electrochemical cells opposite to terminal ends of the plurality of electrochemical cells having terminals. The system also includes a cage disposed about the battery module, where the cage includes a cage side positioned next to the second side of the housing of the battery module and having openings disposed in a portion of the cage back side. The openings enable air to be drawn through the openings from an external area such that the air enters into the cage and passes over the two heat sinks of the battery module along a path extending from first ends of the two heat sinks to second ends of the two heat sinks.

DRAWINGS

Various aspects of this disclosure may be better understood upon reading the following detailed description and upon reference to the drawings in which:

FIG. 7 is a perspective view of an embodiment of a cage for use in the vehicle of FIG. 1 and configured to house a battery module, in accordance with an aspect of the present disclosure.

DETAILED DESCRIPTION

Figure 1:
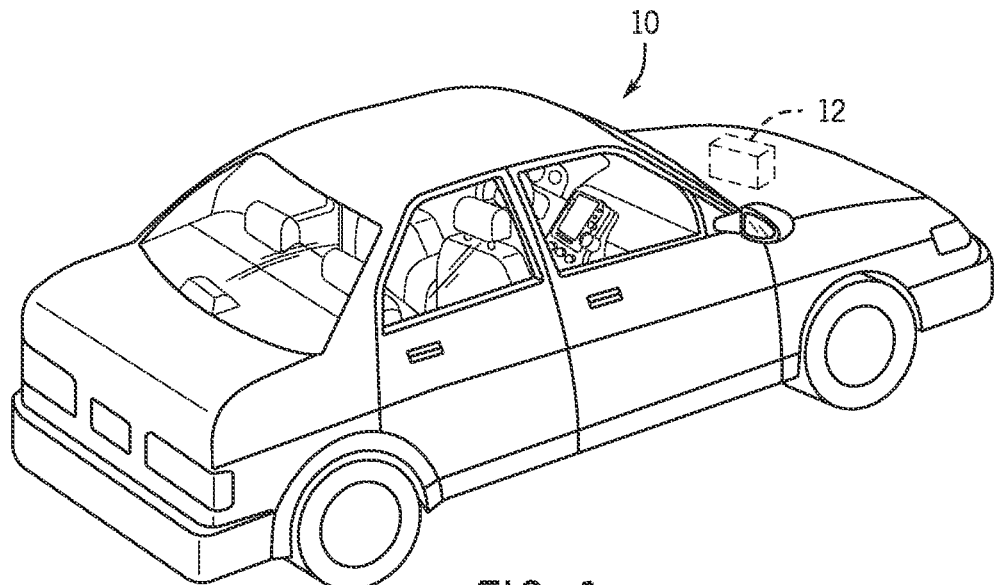
FIG. 1 is a perspective view of a vehicle having a battery system configured in accordance with present embodiments to provide power for various components of the vehicle.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a housing and a number of battery cells (e.g., Lithium-ion (Li-ion) electrochemical cells) arranged within the housing to provide particular voltages and/or currents useful to power, for example, one or more components of an xEV. As another example, battery modules in accordance with present embodiments may be incorporated with or provide power to stationary power systems (e.g., non-automotive systems).

Aspects of battery modules in accordance with the present disclosure may increase in temperature during operation of the battery modules. For example, as an electrochemical cell of a battery module generates and/or provides power to the vehicle, the electrochemical cell (and surrounding features of the battery module) may become hot (e.g., relative to the temperature of the same features when the battery module is not operating). It is now recognized that certain features can limit such temperature increases in an efficient manner. Indeed, battery modules in accordance with the present disclosure include thermal management features (e.g., passive thermal management features) configured to cool the battery module. For example, the passive thermal management features may be configured to extract heat from the battery module (e.g., from the electrochemical cells of the battery module) and route the heat away from the electrochemical cells (e.g., to an area external to the battery module). The battery module may include certain types of thermal pads, thermal adhesives, thermal fillers, or gap pads adhesively coupled to the electrochemical cells (e.g., to base ends of the electrochemical cells) on one side and adhesively coupled on another side to a heat sink (e.g., a metal or thermally conductive cooling plate having cooling fins extending therefrom) in-molded with a housing of the battery module.

Also in accordance with present embodiments, various components of the battery module may be particularly oriented to enhance thermal management of the battery module. For example, the electrochemical cells (e.g., prismatic Lithium-ion electrochemical cells) may be arranged in one or more stacks such that their base ends are disposed adjacent to the heat sink (or heat sinks). Generally, heat transfer may be more efficient through base ends of the prismatic electrochemical cells than other areas of the cells. The one or more stacks of prismatic electrochemical cells may extend substantially vertically, such that the electrochemical cells are disposed in the housing with broad faces of the electrochemical cells (e.g., faces extending between the base ends of the electrochemical cells and terminal ends the electrochemical cells opposite the base ends) stacked against each other and orthogonal to Earth's gravitational force. In other words, substantially planar surfaces of the base ends of the electrochemical cells (and the heat sink(s) disposed adjacent the base ends) may extend substantially parallel to Earth's gravitational force in normal operating conditions, and the stacks may be extending in substantial alignment to Earth's gravitational force. This reference to Earth's gravitational force is provided as an orientation reference for certain embodiments. Other embodiments may include similar relative arrangements with respect to components (e.g., the stacks and the heat sinks) but different positioning relative to the Earth's gravitational force. For example, the positioning of various components of the battery module, with respect to gravity, may change over time as the vehicle travels over sloped surfaces, while the positioning of various components of the battery module, with respect to each other, may not change.

The above described orientation may enable a positioning of the battery module within a cage (or other casing) having multiple openings proximate a lower end of the cage, where the openings are configured to enable a chimney effect through the cage (and proximate the airspace along the lateral side of the battery module (e.g., the lateral side having the heat sinks)). The chimney effect is enabled, in part, due to differences in buoyant forces that arise from temperature differences between the air outside of the cage and the air inside of the cage (e.g., the air in the airspace). For example, the openings may enable cool air from outside of the cage to enter through the bottom end of the cage and flow upwardly over the passive thermal management features (e.g., heat sinks) disposed proximate the base ends of the electrochemical cells. Thus, the positioning of the battery module in the cage, the holes or openings disposed in the bottom end of the cage, and the orientation of the base ends of the electrochemical cells (and heat sinks) may, together, enable improved cooling of the battery module via the chimney effect. However, it should be noted that the components of the battery module may not always be substantially parallel to gravity, due to the fact that the vehicle may travel up and over hills or other sloped surfaces. In other words, the reference to Earth's gravitational force is provided as a relative reference for certain embodiments, particularly when the vehicle having the battery module is on a flat surface. Other embodiments may include similar relative arrangements with respect to the components (e.g., the stack and heat sinks), but different positioning relative to the Earth's gravitational force, particularly when the vehicle having the battery module is on a sloped surface. In general, the passive thermal management features (e.g., heat sinks) may be oriented to coordinate with Earth's gravitational force to enable the air flow to pass over the thermal management features, as described in detail below.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
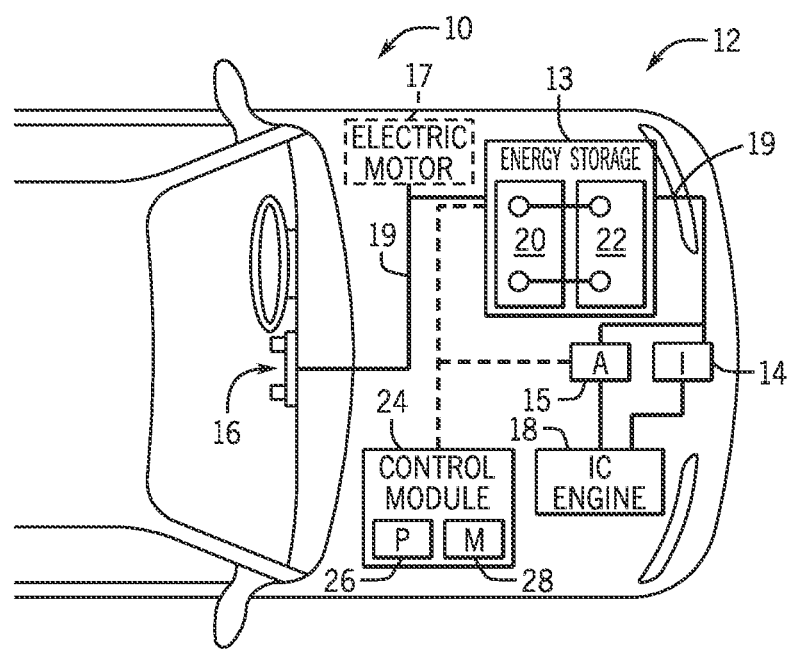
FIG. 2 is a cutaway schematic view of an embodiment of the vehicle and the battery system of FIG. 1.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 and a lead-acid (e.g., a second) battery module 22, which each includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

Figure 3:
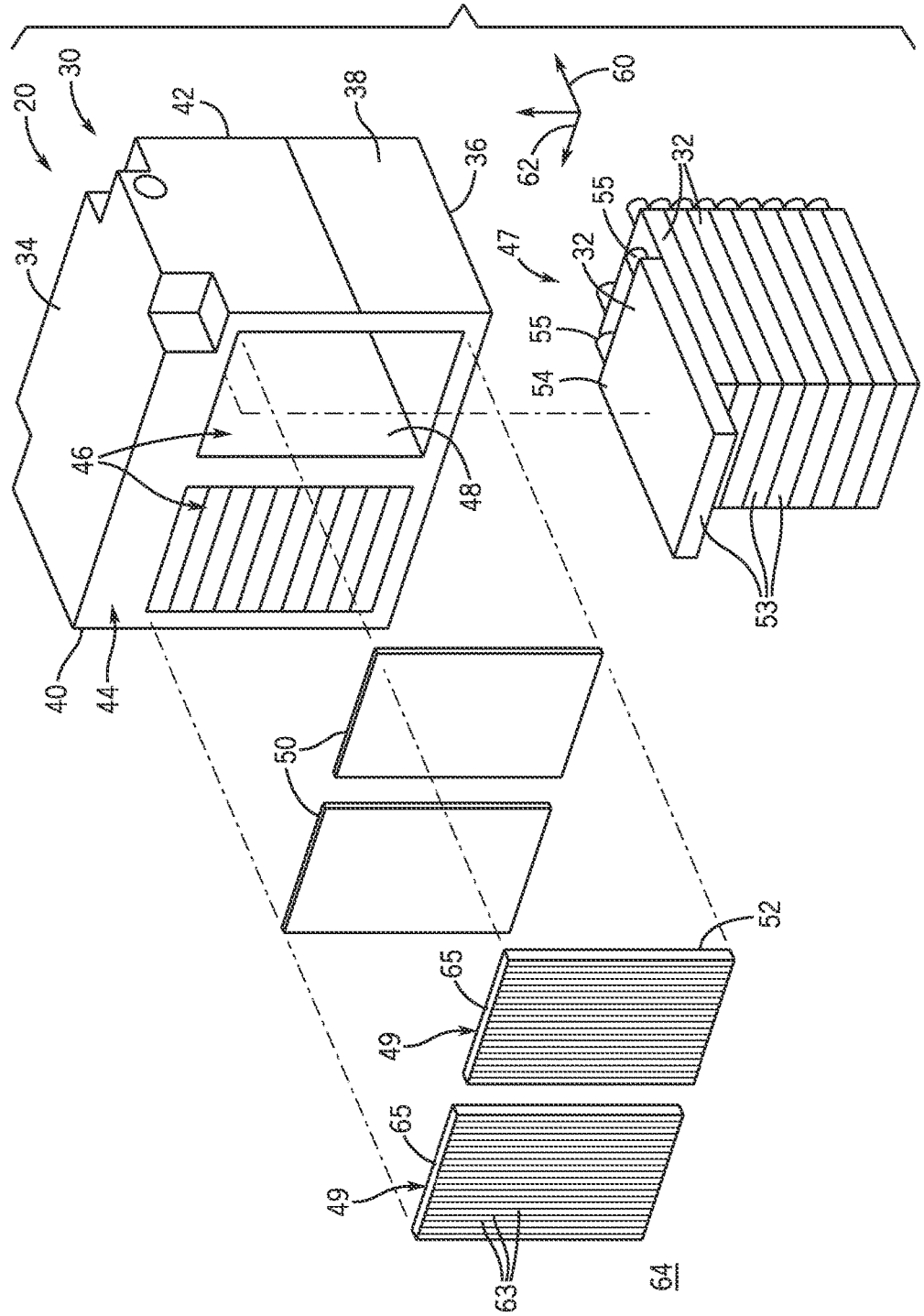
FIG. 3 is a partially exploded back perspective view of an embodiment of a battery module for use in the vehicle of FIG. 1, in accordance with an aspect of the present disclosure.

A back perspective view of one embodiment of the battery module 20, in accordance with the present disclosure, is shown in FIG. 3. In the illustrated embodiment, the battery module 20 includes a housing 30 configured to house a number of electrochemical cells 32. For example, the electrochemical cells 32 may be prismatic Lithium-ion (Li-ion) electrochemical cells (e.g., lithium nitrate cells). The illustrated housing 30 includes a top side 34 and a bottom side 36 opposite the top side 34. The housing 30 also includes two reinforcing sides 38, 40 (e.g., reinforcing lateral sides) extending between the top side 34 and the bottom side 36. Further, the housing 30 includes a front side 42 extending between the top side 34, the bottom side 36, and the two reinforcing sides 38, 40, and a back side 44 disposed opposite to the front side 42 (e.g., back and front lateral sides). It should be noted that, in the illustrated embodiment, the sides 34, 36, 38, 40, 42, 44 each include at least some material integral with the housing 30. However, in other embodiments, one or more of the sides 34, 36, 38, 40, 42, 44 of the housing 30 may be fully open (e.g., having no material integrally formed with the housing 30), where a cover of the housing 30 is disposed over the fully open side(s) to enclose the housing 30. One of ordinary skill in the art would recognize that the term "side" may refer to an area of the housing 30, and does not exclude housings of the present disclosure from having open sides with one or more covers disposed over the open sides.

In the illustrated embodiment, the back side 44 includes two rectangular openings or cutouts 46 configured to be aligned with corresponding stacks 47 of electrochemical cells 32 inside the housing 30. For example, the stacks 47 of electrochemical cells 32 form a rectangular block, and the rectangular cutouts 46 are disposed in the back side 44 of the housing 30 to align with the rectangular prism shaped stacks 47. In certain embodiments, each stack 47 may include 3, 6, or 10 electrochemical cells 32. The housing 30 is configured to house the two stacks 47 of electrochemical cells 32, each stack 47 being separated by an internal partition 48 of the housing 30 (e.g., a wall extending from the back side 44 of the housing 30 inwards, into the housing 30), where each stack 47 is aligned with a respective one of the two rectangular cutouts 46 in the back side 44 of the housing 30, as described above. The rectangular cutouts 46 are each configured to receive, for example, respective heat sinks 49, where each heat sink 49 is configured to be disposed adjacent to a respective one of the stacks 47 of electrochemical cells 32. The heat sinks 49, in some embodiments, may be in-molded or overmolded with the back side 44 of the housing 30 within the rectangular cutouts 46. In other words, the housing 30 may include the heat sinks 49 as in-molded (e.g., overmolded) components of the housing 30 to fully enclose the back side 44 of the housing 30. It should be noted that the rectangular cutouts 46 are shaped to correspond to shapes of the stacks 47 of electrochemical cells 32 and could include different geometries (e.g., square, elongated tetragon, or curved opening). For example, the stacks 47 may form a cube shape (e.g., with a square shaped back side), and the cutouts 46 may, thus, be square, along with a square foot print of the each heat sink 49.

Further, the electrochemical cells 32 may be separated from the two heat sinks 49 via thermal interfaces 50, which are, in the illustrated embodiment, rectangular in shape and aligned with the rectangular prism shaped stacks 47 of electrochemical cells 32 and the heat sinks 49. For example, each heat sink 49 may be separated from the respective stack 47 of electrochemical cells 32 by a respective thermal interface 50. The thermal interface 50 may be adhesively coupled to an internal surface 52 of the heat sink 49. For example, the thermal interface 50 may be disposed on the internal surface 52 of the heat sink 49 before the electrochemical cells 32 are disposed into the housing 30. Accordingly, the electrochemical cells 32 are disposed into the housing 30 and, for example, pressed into the thermal interfaces 50 adhesively coupled to the heat sinks 49. The thermal interfaces 50 may be thermal gap pads, thermal fillers, thermal adhesives, thermal pastes, or some other adhesive thermal interface. Generally, the thermal interface 50 may be thermally conductive (e.g., to enhance a heat transfer path from base ends 53 of the electrochemical cells 32 to the heat sink 49), compressive (e.g., to reduce air bubbles or separation between base ends 53 of the electrochemical cells 32 and the heat sink 49), and/or electrically insulative (e.g., to electrically isolate the heat sink 49 from the electrochemical cells 32). It should be noted that, in some embodiments, the heat sinks 49 may be in-molded (e.g., overmolded) in the illustrated rectangular cutouts 46 of the housing 30 such that the internal surfaces 52 of the heat sinks 49 are flush with an internal surface of the back side 44 of the housing 30. In other embodiments, the internal surfaces 52 of the heat sinks 49 may not be flush with the internal surface of the back side 44 of the housing 30. For example, in some embodiments, the heat sinks 49 may be in-molded within the illustrated rectangular cutouts 46 in the back side 44 of the housing 30 such that the thermal interfaces 50, after being disposed onto the internal surfaces 52 of the heat sinks 49, are flush with the internal surface of the back side 44 of the housing 30. Indeed, in such embodiments, the thermal interfaces 50 (which may be compressive) may become flush with the internal surface of the back side 44 of the housing 30 only after the electrochemical cells 32 are pressed into the thermal interfaces 50. In accordance with present embodiments, a heat transfer path may be defined from the base ends 53 of the electrochemical cells 32, to the thermal interfaces 50, and to the heat sinks 49.

However, it should be noted that the internal partition 48 may also extract heat from the electrochemical cells 32 and transfer the heat toward the back side 44 of the housing 30, where the back side 44 of the housing 30 includes the heat sinks 49 disposed therein or thereon.

It should be noted that, in some applications (e.g., in some vehicular applications), the illustrated orientation of various components of the battery module 20 may facilitate cooling of the battery module 20. For example, in the illustrated embodiment, the electrochemical cells 32 are disposed into the housing 30 such that the base ends 53 of the electrochemical cells 32 (e.g., the base ends 53 opposite to terminal ends 54 of the electrochemical cells 32, where the terminal ends 54 include terminals 55 extending therefrom) are disposed proximate the back side 44 of the housing 30 and, thus, proximate the thermal interfaces 50 and heat sinks 49 of the battery module 20. This orientation may be beneficial in that heat transfer through the base ends 53 of the electrochemical cells 32 is more efficient than through other areas and may enhance thermal control of the battery module 20. For example, extracting heat through the base ends 53 of the electrochemical cells 32 may increase a heat transfer coefficient compared to embodiments configured to extract heat through other areas of the electrochemical cells 32. Further, extracting heat through the base ends 53 of the electrochemical cells 32 may reduce a thermal gradient across one or more of the electrochemical cells, as the heat transfer path (e.g., from the base ends 53 of the electrochemical cells 32 to the heat sinks 49) is generally symmetrical with respect to a longitudinal axis extending through each electrochemical cell 32 (e.g., in direction 60). Thermal gradients may also be reduced, in the illustrated embodiment, by way of the utilization of two different heat sinks 49, one for each stack 47 of electrochemical cells 32. For example, in embodiments having one global heat sink spanning both stacks 47 of electrochemical cells 32, the portion of the global heat sink between the stacks 47, which would be aligned with the internal partition 48 in the illustrated embodiment, may promote a thermal gradient across the global heat sink (e.g., in direction 62) and inefficiently extract heat from the electrochemical cells 32 (compared to portions aligned with the stacks 47), thus wasting material.

Figure 4:
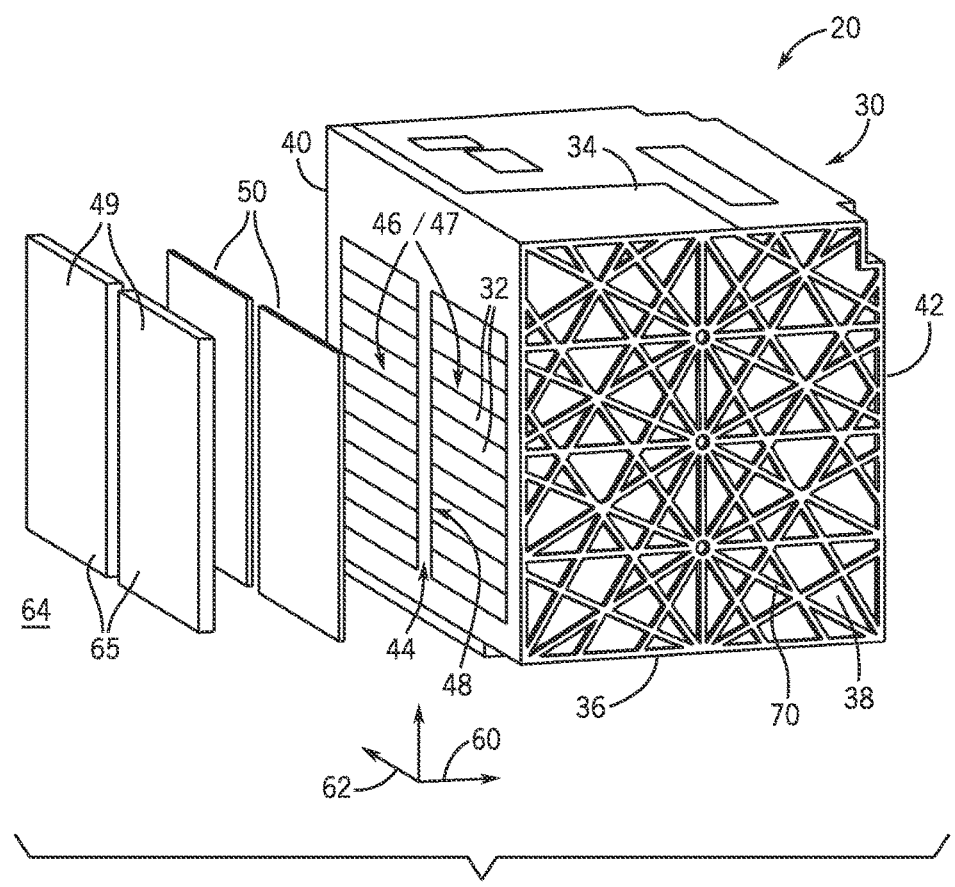
FIG. 4 is a partially exploded back perspective view of an embodiment of a battery module for use in the vehicle of FIG. 1, in accordance with an aspect of the present disclosure.

It should be also noted that, in the illustrated embodiment, each heat sink 49 includes cooling fins 63 configured to increase a surface area between the heat sinks 49 and environment 64, where the cooling fins 63 extend from (and, in some embodiments, are integrally formed with) a thermally conductive cooling plate 65. In other embodiments, the heat sink 49 may only include the thermally conductive cooling plates 65 (e.g., without cooling fins 63). For example, FIG. 4 shows a perspective view of an embodiment of the battery module 20 with the housing 30, where the heat sinks 49 comprise only the thermally conductive cooling plates 65 in-molded (e.g., overmolded) into the back side 44 of the housing 30. The illustrated embodiment also includes a webbed pattern 70 on the reinforcing sides 38, 40 of the housing 30, where the webbed pattern 70 provides structural rigidity to the battery module 20 and also provides an increased surface area of the housing exposed to the environment 64 for enhancing thermal management. The webbed pattern 70 is shown on the reinforcing sides 38, 40 of the housing 30, although the webbed pattern 70 may be disposed on any side of the housing 30 (e.g., on the back side 44 of the housing 30 in portions of the back side 44 surrounding the heat sinks 49). Indeed, in some embodiments, the webbed pattern 70 may also be disposed on the heat sinks 49 (e.g., on the thermally conductive cooling plates 65).

Figure 5:
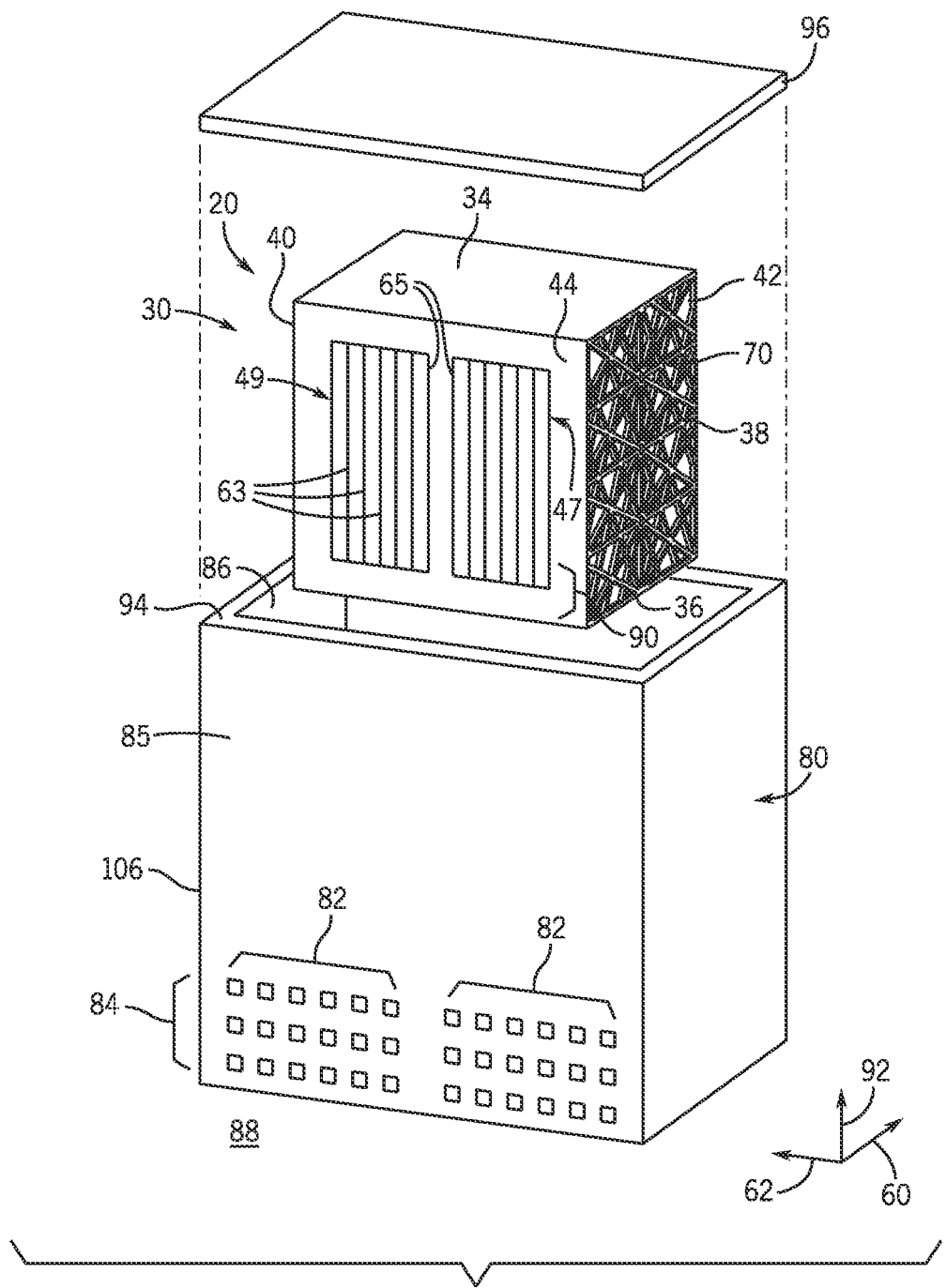
FIG. 5 is an exploded back perspective view of an embodiment of a cage and an embodiment of a battery module disposed within the cage, in accordance with an aspect of the present disclosure.

In some embodiments, as previously described, the illustrated orientation of the heat sinks 49 in the back side 44 of the housing 30 and the orientation of the electrochemical cells 32 within the housing 30 may enable enhanced thermal management of the battery module 20. For example, in some embodiments, an air flow may be induced over the heat sinks 49 via a chimney effect (e.g., stack effect) generated by components surrounding the battery module 20. In FIG. 5, a partially exploded back perspective view of an embodiment of the battery module 20 disposed within a cage 80 is shown. The cage 80 may be generally configured to protect the battery module 20 from external objects, but may also be configured to promote a flow of air proximate the heat sinks 49 of the battery module 20.

For example, in the illustrated embodiment, the cage 80 includes openings 82 disposed in a lower portion 84 on a back side 85 of the cage 80. The back side 85 of the cage 80 is generally aligned with the back side 44 of the housing 30. In other words, in the illustrated embodiment, the back side 85 of the cage 80 and the back side 44 of the housing 30 are substantially parallel with one another. The openings 82 in the illustrated embodiment may be circular, triangular, rectangular, or some other shape, and may be configured to draw air into an inside 86 of the cage 80 from an external area 88 outside of the cage 80. For example, the air is drawn into the inside 86 of the cage 80 due to differences in buoyancy between air in the external area 88 and air in the inside 86 of the cage 80. Due to a difference in air density (e.g., resulting from temperature differences) between the external area 88 and the inside 86 of the cage 80, cooler air from the external area 88 is drawn into the inside 86 of the cage 80 through the openings 82 in the lower portion 84 of the back side 85 of the cage 80. The air enters into the inside 86 of the cage 80 proximate bottom portions 90 of the heat sinks 49 disposed in the back side 44 of the housing 30 of the battery module 20. As the air comes into contact with the heat sinks 49, heat is transferred from the heat sinks 49 to the air, causing the air to rise upwardly over the heat sinks 49. The air continues to extract heat from the heat sinks 49 as it rises upwardly, in direction 92, until the air reaches a top surface 94 of the cage 80. The cage 80 may be open ended on the top surface 94 (or the top surface 94 may have an upper opening), enabling the air to escape (e.g., vent) back into the external area 88 outside of the cage 80. This expulsion of air causes a suction that pulls air through the openings 82. A hood 96 (e.g., a hood of a vehicle in which the battery module 20 is disposed) may be disposed over the cage 80, and the air may transfer heat to the hood 96 or to other components proximate to the top surface 94 of the cage 80 or otherwise disposed outside of the cage 80.

Figure 6:
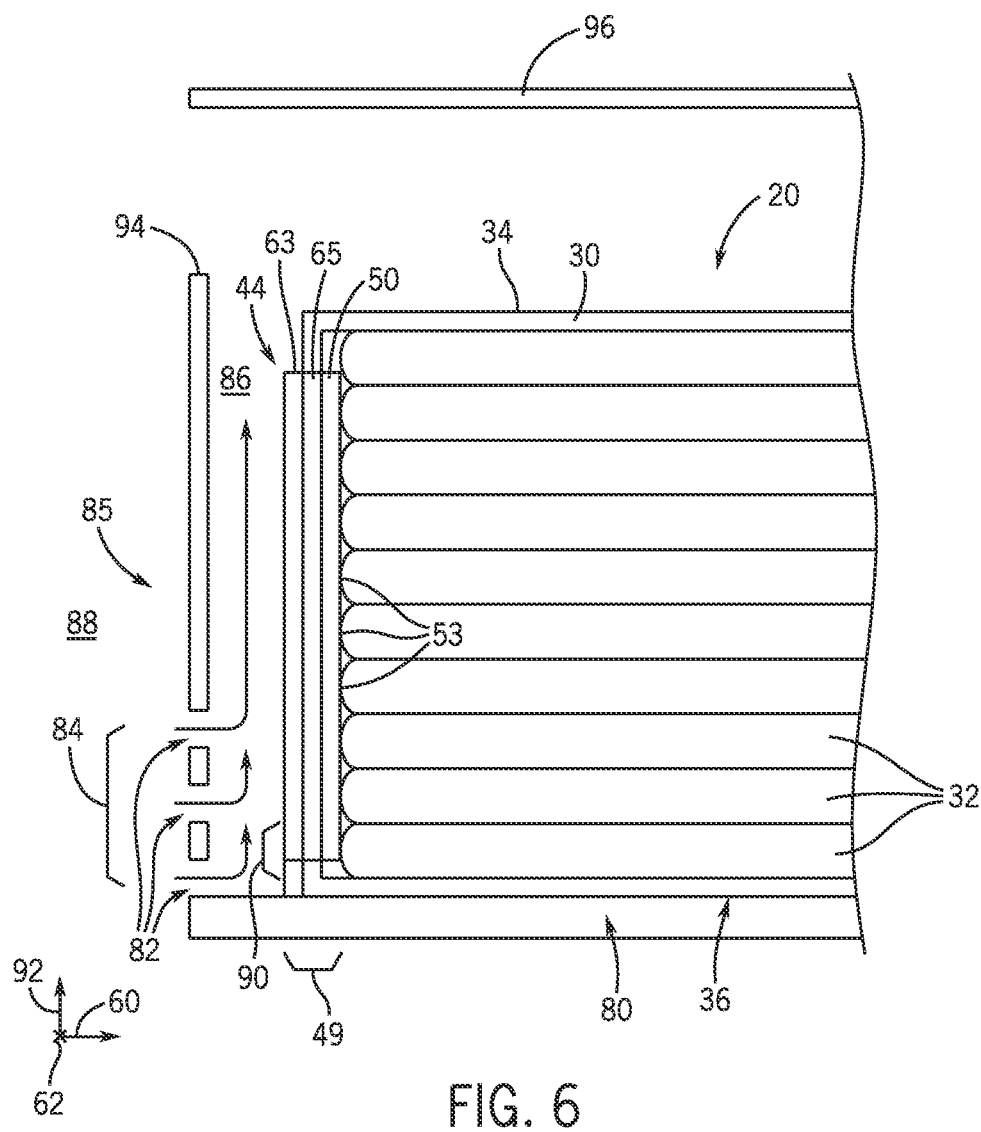
FIG. 6 is a side cross-sectional view of an embodiment of the battery module disposed within the cage of FIG. 5, in accordance with an aspect of the present disclosure.

As previously described, the orientation of certain battery module components may enable enhanced thermal management via the chimney effect induced by the interactions discussed above. For clarity, a cross-sectional side view of the battery module 20 disposed within the cage 80 is shown in FIG. 6. For example, the chimney effect, in the illustrated embodiment, generally promotes initial air flow through the openings 82 in the lower portion 84 of the back side 85 of the cage 80 and then generally in direction 92, substantially parallel to Earth's gravitational force. This is due to the fact that, in general, hot air rises with respect to gravity (e.g., due to differences in buoyancy that arises due to differences in temperature, as previously described). Thus, because the heat sinks 49 extend upwardly along their lengths in direction 92 (e.g., in the back side 44 of the housing 30), the air flow travels over the heat sinks 49 in direction 92 within the inside 86 of the cage 80 (e.g., in the airspace proximate to the heat sinks 49). Further, disposing base ends 53 of the electrochemical cells 32 proximate the heat sinks 49 enables efficient and symmetric heat transfer, as previously described, through the base ends 53 to the heat sinks 49 (e.g., through thermal interfaces 50, as previously described). Accordingly, the heat transfer path (from the base ends 53 of the electrochemical cells 32 to the heat sinks 49) guides heat from the electrochemical cells 32 to the heat sinks 49, directly proximate to the air flow (proximate the heat sinks 49) generated by the chimney effect described above.

It should be noted that the cage 80 may also include additional or supplemental openings configured to draw air into the inside 86 of the cage 80 proximate to areas above the bottom portion 84 of back side 85 of the cage 80. For example, a perspective view of an embodiment of the cage 80 is shown in FIG. 7. In the illustrated embodiment, the openings 82 are disposed in the lower portion 84 of the back side 85 of the cage 80. Additional or supplemental openings 99 are disposed in a middle portion 100 and a top portion 101 of the cage 80. The supplementary openings 99 may be configured to draw air into the inside 86 of the cage 80 in a similar manner as described with respect to the openings 82.

For example, the openings 82 draw air into the inside 86 of the cage 80 and the air extracts heat from the battery module 20 as the air travels upwardly in direction 92, as previously described. As the air rises in direction 92 within the inside 86 of the cage 80 (and continues to extract heat from the battery module 20), the air rises in temperature. Thus, the air may extract less and less heat from the battery module 20 as it travels upwardly, because the air is hotter than when it first entered the inside 86 of the cage 80 (e.g., the air continues to increase in temperature). Accordingly, the supplemental openings 99 in the middle and upper portions 100, 101 of the back side 85 of the cage 80 draw in additional air from the outside 88 of the cage 80, such that the additional air cools portions of the battery module 20 proximate to the middle and upper portions 100, 101 of the back side 85 of the cage 80. It should be noted that there may be a lesser number of supplemental openings 99 than openings 82, as the additional air drawn into the inside 86 of the cage 80 through the supplemental openings 99 may combine with the air already drawn in through the openings 82 in the lower portion 84 of the cage 80. For example, in the illustrated embodiment, the supplemental openings 99 are more widely dispersed in directions 62 and 92. Accordingly, the supplemental openings 99 draw in less air through the middle and upper portions 100, 101 of the back side 85 of the battery module 20 than the amount of air the openings 82 draw in through the lower portion 84 of the back side 85 of the cage 80. The additional air combines with the air drawn in via the openings 82 to cool the battery module 20. This configuration may enable a more even cooling of the battery module 20 than, for example, configurations having only the openings 82 (e.g., without the supplemental openings 99).

It should also be noted that the cage 80 may include openings on any other face or side of the cage 80 to induce further air to be drawn into the inside 86 of the cage proximate other sides of the battery module 20. For example, in the embodiment of the cage 80 in FIG. 7, the openings 82 and supplemental openings 99 are shown on the back side 85 of the cage 80, but other openings (e.g., other openings 82 and supplemental openings 99) may also be disposed on a front side 102 of the cage 80 opposite to the back side 100, and/or on intervening sides 104, 106 extending between the front side 102 and the back side 100.

One or more of the disclosed embodiments, alone or in combination, may provide one or more technical effects useful in the manufacture of battery modules, and portions of battery modules. In general, the disclosed battery modules include passive thermal management features generally configured to enhance thermal management of the battery modules. For example, the thermal management features are configured to provide a heat transfer path through base ends of electrochemical cells to heat sinks adjacent the base ends of the electrochemical cells. Further, a crash box disposed around the battery module may promote air flow over the heat sinks from a bottom of the heat sinks upwardly, via a chimney effect, in accordance with the description above. The orientation of the passive thermal management features and various components of the battery module (e.g., the electrochemical cells, the heat sinks, and the cage) may enable improved thermal management of the battery module. The technical effects and technical problems in the specification are exemplary and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the disclosed subject matter. The order or sequence of any process or method steps may be varied or re-sequenced according to alternative embodiments. Furthermore, in an effort to provide a concise description of the exemplary embodiments, all features of an actual implementation may not have been described. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A Lithium-ion (Li-ion) battery system, comprising:
   a battery module, comprising:
      a plurality of Li-ion electrochemical cells;
      a housing that houses the plurality of Li-ion electrochemical cells, wherein the housing comprises a first side and a second side opposite to the first side;
      a heat sink coupled with the second side of the housing; and
      a thermal interface disposed between, and in contact with, the heat sink and the plurality of Li-ion electrochemical cells, wherein the thermal interface physically contacts base ends of the plurality of Li-ion electrochemical cells opposite to terminal ends of the plurality of Li-ion electrochemical cells comprising terminals; and
   a cage disposed about the housing, the cage having a cage side positioned next to the second side of the housing of the battery module and having a plurality of openings disposed in a portion of the cage side, wherein the plurality of openings enable air to be drawn through the plurality of openings from an area external to the cage such that the air enters into the cage and passes over the heat sink of the battery module along a path extending from a first end of the heat sink to a second end of the heat sink, and wherein the cage side of the cage, the second side of the housing, and the portion of the cage side are relatively positioned with respect to each other such that the air is drawn through the plurality of openings and along the path via a chimney effect.

2. The Li-ion battery system of claim 1, wherein each of the Li-ion electrochemical cells are prismatic and the plurality of Li-ion electrochemical cells comprises two adjacent stacks of Li-ion electrochemical cells housed within the housing, wherein the heat sink comprises two thermally conductive plates aligned with the two adjacent stacks of Li-ion electrochemical cells, and wherein the thermal interface comprises two thermal interface portions respectively disposed between the two heat sinks and the two adjacent stacks of Li-ion electrochemical cells.

3. The Li-ion battery system of claim 2, wherein the housing comprises an internal partition separating the two adjacent stacks of Li-ion electrochemical cells and extending from an internal surface of the second side of the housing toward the first side of the housing.

4. The Li-ion battery system of claim 1, wherein one or more additional cage sides include a second plurality of openings to enable air to be drawn into the cage.

5. The Li-ion battery system of claim 1, wherein the heat sink comprises a thermally conductive plate.

6. The Li-ion battery system of claim 5, wherein the thermally conductive plate comprises a plurality of cooling fins extending therefrom and away from the second side of the housing.

7. The Li-ion battery system of claim 1, wherein the thermal interface comprises a thermal gap pad, a thermal filler, a thermal paste, or a thermal adhesive.

8. The Li-ion battery system of claim 1, wherein an internal surface of the heat sink is flush with an internal surface of the second side of the housing.

9. The Li-ion battery system of claim 1, wherein the housing comprises two reinforcing sides extending between the first side and the second side, and the two reinforcing sides comprise a webbed pattern that increases a surface area of the housing exposed to an area outside of the housing.

10. The Li-ion battery system of claim 1, wherein the heat sink is in-molded with the second side of the housing.

11. The Li-ion battery system of claim 1, wherein each Li-ion electrochemical cell of the plurality of Li-ion electrochemical cells is a prismatic cell.

12. The Li-ion battery system of claim 1, wherein the plurality of Li-ion electrochemical cells are disposed in two stacks of Li-ion electrochemical cells, and each stack comprises 3, 6, or 10 Li-ion electrochemical cells.

13. The Li-ion battery system of claim 1, wherein the plurality of openings extends through the cage side in a first direction, wherein the path extends in a second direction, and wherein the first direction is transverse to the second direction.

14. A battery system, comprising:
a battery module having a housing configured to house electrochemical cells therein, wherein the battery module comprises a heat sink coupled to a first side of the housing, wherein base ends of the electrochemical cells are disposed proximate to the first side of the housing; and
a cage configured to receive the battery module, wherein the cage comprises:

a cage side configured to be aligned with the first side of the housing of the battery module and having a plurality of openings disposed in a lower portion of the cage side and configured to enable a chimney effect across the plurality of openings, wherein the plurality of openings extends through the cage side in a first direction, wherein the plurality of openings enables air to be drawn, via the chimney effect, through the plurality of openings from an area external to the cage such that the air enters into the cage through the lower portion of the cage side and passes over the heat sink of the battery module along a path extending in a second direction from a first end of the heat sink to a second end of the heat sink, and wherein the first direction is transverse to the second direction.

15. The battery system of claim 14, wherein the heat sink coupled to the first side of the housing is in-molded in the first side of the housing.

16. The battery system of claim 14, wherein a second cage side comprises a second plurality of openings disposed in a second portion of the second cage side, wherein the second plurality of openings enable air to be drawn through the second plurality of openings from the area external to the cage such that the air enters into the cage.

17. The battery system of claim 14, comprising an upper opening in a top of the cage configured to enable the air to vent through the upper opening.

18. The battery system of claim 17, comprising a hood disposed proximate to the top of the cage and configured to extract heat from the air vented through the upper opening.

19. A battery system, comprising:
a battery module;
a housing of the battery module that houses a plurality of electrochemical cells in two stacks of electrochemical cells, wherein the housing comprises a first side and a second side opposite to the first side, and wherein the second side comprises two cutouts, each cutout being aligned with a respective one of the two stacks of electrochemical cells;
two heat sinks of the battery module disposed in the two cutouts and aligned with the two stacks of electrochemical cells;
two thermal interfaces of the battery module, each thermal interface being disposed between, and in contact with, a respective one of the two heat sinks and a respective one of the two stacks of electrochemical cells, wherein the two thermal interfaces physically contact base ends of the plurality of electrochemical cells opposite to terminal ends of the plurality of electrochemical cells comprising terminals; and
a cage disposed about the battery module, wherein the cage comprises:
a cage side aligned with the second side of the housing of the battery module and having a plurality of openings disposed in a lower portion of the cage side, wherein the plurality of openings enables air to be drawn through the plurality of openings via a chimney effect from an external area such that the air enters into the cage proximate the lower portion of the cage side and passes over the two heat sinks of the battery module along a path extending from first ends of the two heat sinks to second ends of the two heat sinks.

20. The battery system of claim 19, wherein the two heat sinks are in-molded with the second side of the housing.

21. The battery system of claim 19, wherein the cage side, the second side of the housing, and the two heat sinks are oriented to coordinate with Earth's gravitational force to encourage the air to flow over the two heat sink from the bottoms of the two heat sinks upwardly.

22. The battery system of claim 19, wherein the housing comprises an internal partition separating the two stacks of electrochemical cells and extending from an internal surface of the second side of the housing toward the first side of the housing.

23. The battery system of claim 19, wherein the plurality of openings extends through the cage side in a first direction, wherein the path extends in a second direction, and wherein the first direction is transverse to the second direction.

\* \* \* \* \*

UNITED STATES PATENT AND TRADEMARK OFFICE
CERTIFICATE OF CORRECTION

PATENT NO. : 9,825,343 B2  
APPLICATION NO. : 14/502803  
DATED : November 21, 2017  
INVENTOR(S) : Obasih et al.

Page 1 of 1

It is certified that error appears in the above-identified patent and that said Letters Patent is hereby corrected as shown below:

On the Title Page

In Item (71), under "Applicant", in Column 1, Line 2, delete "MA" and insert -- MI --, therefor.

In the Specification

In Column 1, Line 61, delete "all-electric" and insert -- all electric --, therefor.

In Column 3, Line 18, delete "DRAWINGS" and insert -- BRIEF DESCRIPTION OF THE DRAWINGS --, therefor.

In Column 12, Line 1, delete "back side 100," and insert -- back side 85, --, therefor.

In Column 12, Line 2, delete "back side 100." and insert -- back side 85. --, therefor.

In the Claims

In Column 15, Line 4, in Claim 21, delete "sink" and insert -- sinks --, therefor.

Signed and Sealed this  
Sixth Day of March, 2018

Andrei Iancu  
*Director of the United States Patent and Trademark Office*